(12) United States Patent
Mercuri (10) Patent No.: US 8,510,426 B2
(45) Date of Patent: Aug. 13, 2013

(54) COMMUNICATION AND COORDINATION BETWEEN WEB SERVICES IN A CLOUD-BASED COMPUTING ENVIRONMENT

(75) Inventor: Marc Mercuri, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 275 days.

(21) Appl. No.: 12/907,996

(22) Filed: Oct. 20, 2010

(65) Prior Publication Data

US 2012/0102168 A1 Apr. 26, 2012

(51) Int. Cl.
*G06F 15/173* (2006.01)

(52) U.S. Cl.
USPC ............ 709/223; 709/204; 709/205; 709/224

(58) Field of Classification Search
USPC .................................. 709/223, 204, 205, 224
See application file for complete search history.

(56) References Cited

U.S. PATENT DOCUMENTS

| | | | |
|---|---|---|---|
| 7,062,559 B2 | 6/2006 | Yoshimura et al. | |
| 7,162,436 B1 | 1/2007 | Eckel, Jr. | |
| 7,269,157 B2 | 9/2007 | Klinker et al. | |
| 7,310,684 B2 | 12/2007 | Patrick et al. | |
| 7,743,001 B1 | 6/2010 | Vermeulen et al. | |
| 2002/0194324 A1 | 12/2002 | Guha | |
| 2003/0061365 A1* | 3/2003 | White et al. | 709/229 |
| 2003/0131073 A1* | 7/2003 | Lucovsky et al. | 709/219 |
| 2003/0149735 A1 | 8/2003 | Stark et al. | |
| 2005/0034001 A1 | 2/2005 | Pontarelli | |
| 2005/0172027 A1 | 8/2005 | Castellanos et al. | |
| 2005/0251823 A1 | 11/2005 | Saarikivi | |
| 2006/0080120 A1* | 4/2006 | Tcherevik | 705/1 |
| 2006/0161554 A1* | 7/2006 | Lucovsky et al. | 707/10 |
| 2006/0224748 A1 | 10/2006 | Gupta et al. | |
| 2007/0005777 A1 | 1/2007 | Fremantle et al. | |
| 2007/0156919 A1 | 7/2007 | Potti et al. | |
| 2008/0080396 A1 | 4/2008 | Meijer et al. | |
| 2008/0080552 A1 | 4/2008 | Gates et al. | |
| 2008/0082693 A1 | 4/2008 | Meijer et al. | |
| 2008/0104393 A1 | 5/2008 | Glasser et al. | |
| 2008/0235384 A1 | 9/2008 | Meek et al. | |
| 2009/0006614 A1 | 1/2009 | Le et al. | |
| 2009/0037896 A1 | 2/2009 | Grechanik et al. | |
| 2009/0048994 A1* | 2/2009 | Applebaum et al. | 706/45 |
| 2009/0150565 A1 | 6/2009 | Grossner et al. | |
| 2009/0157419 A1 | 6/2009 | Bursey | |

(Continued)

OTHER PUBLICATIONS

"Amazon Elastic Compute Cloud (Amazon EC2)," Retrieved Jul. 25, 2010 from http://aws.amazon.com/ec2/, 13 Pages.

(Continued)

*Primary Examiner* — Nicholas Taylor
(74) *Attorney, Agent, or Firm* — Hope Baldauff, LLC (57) ABSTRACT

Technologies are described herein for providing communication and coordination between web services in a cloud-based computing environment. A call to an available events operation is executed in a web service to request subscription event identifiers corresponding to available events at the web service. The subscription event identifiers are received. A subscribe operation is populated with a relevant subscription event identifier related to a subscribed event from the subscription event identifiers. A call to the subscribe operation is executed in the web service to establish a subscription to the web service. A subscription identifier corresponding to the subscription is received. Notifications related to the subscribed event at the web service are received while the subscription is active.

16 Claims, 5 Drawing Sheets

(56) References Cited

U.S. PATENT DOCUMENTS

| | | |
|---|---|---|
| 2009/0196308 A1 | 8/2009 | Pan et al. |
| 2009/0248693 A1 | 10/2009 | Sagar et al. |
| 2010/0030866 A1 | 2/2010 | Bedi |
| 2010/0076856 A1 | 3/2010 | Mullins et al. |
| 2010/0088150 A1 | 4/2010 | Mazhar et al. |
| 2010/0131324 A1 | 5/2010 | Ferris |
| 2010/0131649 A1 | 5/2010 | Ferris |
| 2010/0211782 A1 | 8/2010 | Auradkar et al. |
| 2010/0299763 A1 | 11/2010 | Marcus et al. |
| 2011/0231899 A1 | 9/2011 | Puller et al. |
| 2011/0238459 A1 | 9/2011 | Purcell et al. |
| 2011/0276490 A1 | 11/2011 | Wang et al. |
| 2011/0296022 A1 | 12/2011 | Ferris et al. |
| 2012/0023501 A1 | 1/2012 | Chi et al. |
| 2012/0079490 A1 | 3/2012 | Bond et al. |

OTHER PUBLICATIONS

"Best Ever Cloud-based Monitoring Service Unveiled," May 31, 2010, Retrieved from http://news.znetindia.com/best-ever-cloud-based-monitoring-service-unveiled.html, 4 pgs.

"Cloud Services: Deploy websites, servers and storage on-demand. Only pay for what you need", Retrieved Jul. 25, 2010 from http://tier3.com/cloud-services, 1 pg.

"Microsoft Windows Azure Cloud Computing Service", Retrieved Aug. 20, 2010 from http://www.itstrategists.com/Microsoft-Azure.aspx, 1 pg.

"SOA Software: Frequently Asked Questions," Retrieved Jul. 26, 2010 from http://www.soa.com/solutions/faqs/, 7 Pages.

"webMethods X," Dec. 2007, Retrieved from http://www.softwareag.com/fr/images/SAG_XBroker_FS_Dec07-web_tcm46-33852.pdf, 2 pgs.

"Windows Azure platform", Retrieved Jul. 25, 2010 from http://www.microsoft.com/windowsazure/, 2 pgs.

Braynard, et al., "Opus: an Overlay Peer Utility Service", Aug. 7, 2002, IEEE Proceedings Open Architectures and Network Programming, pp. 167-178.

Buyya et al., "Market-Oriented Cloud Computing: Vision, Hype, and Reality for Delivering IT Services as Computing Utilities", Sep. 25-27, 2008, Proceedings of the 10th IEEE International Conference on High Performance Computing and Communications, HPCC, 9 pgs.

Buyya et al., "Service and Utility Oriented Distributed Computing Systems: Challenges and Opportunities for Modeling and Simulation Communities", Apr. 13-16, 2008, Proceedings of the 41th Annual Simulation Symposium, (ANSS-41), pp. 68-81.

Chandra et al., "Dynamic Resource Allocation for Shared Data Centers Using Online Measurements," 2002, Technical Report, TR02-30, Department of Computer Science, 22 pgs.

Chatterjee, "Messaging Patterns in Service-Oriented Architecture," Apr. 2004, Retrieved from http://msdn.microsoft.com/en-us/library/aa480027.aspx#aj2mpsoarch_topic6, Microsoft Architect Journal, 17 pgs.

Clayman et al., "Monitoring Service Clouds in the Future Internet", 2010, *Towards the Future Internet*. G. Tselentis et al. (Eds.), IOS Press, p. 115-126.

Fankhauser et al., "Service Level Agreement Trading for the Differentiated Services Architecture", Nov. 1999, Swiss Federal Institute of Technology, Computer Engineering and Networks Lab, Technical Report, No. 59, 17 pgs.

Franceschini, et al., "Cloud Computing: An Agile Approach to IT", Retrieved Aug. 3, 2010 from http://www.hds.com/assets/pdf/cloud-computing-an-agile-approach-to-it.pdf, 20 pgs.

Hassidim, "Cloud Tools Command Line Framework", Retrieved Aug. 20, 2010 from http://www.gigaspaces.com/wiki/display/CCF/Cloud+Tools+Command+Line+Framework, 7 pgs.

Leung, "Cloud Monitoring Services: A Resource Guide," Feb. 4, 2010, Retrieved at http://www.datacenterknowledge.com/archives/2010/02/04/cloud-monitoring-services-a-resource-guide/, 12 pgs.

Marko, "Cloud Applications: What's Ready?—Cloud Computing Tiers", Feb. 26, 2010, Processor, vol. 32 No. 5, 4 pgs.

Mitra, "Architecture in practice, Part 5: SOA Scenario 2: Service connectivity options," Dec. 18, 2007, Retrieved from http://www.ibm.com/developerworks/webservices/library/ar-arprac5/index.html, 13 pgs.

Partho, "Top10 Cloud Computing Service Providers in 2010: #8.Go Grid", May 21, 2010, Retrieved from http://blog.taragana.com/index.php/archive/top-10-cloud-computing-service-providers-in-2010/, 8 pgs.

Loh, Peter, "Automating Cloud Services", Retrieved at << http://www.tapinsystems.com/downloads/Automating_Cloud_Services.pdf >>, Nov. 12, 2009, p. 1-14.

Taft, Darryl K., "Microsoft Cloud Services", Retrieved at << http://www.devsource.com/c/a/Architecture/CSC-to-Resell-Microsoft-Cloud-Services/ >>, Jul. 5, 2009, pp. 2.

Parameswaran, et al., "Cloud Interoperability and Standardization", Retrieved at << http://www.infosys.com/research/publications/setlabs-briefings/Documents/cloud-interoperability-standardization.pdf >>, vol. 7 No. 7, 2009, p. 19-27.

U.S. Notice of Allowance dated Oct. 15, 2012 in U.S. Appl. No. 12/900,481.

U.S. Official Action dated Nov. 21, 2012 in U.S. Appl. No. 12/901,591.

U.S. Official Action dated May 6, 2013 in U.S. Appl. No. 12/901,591.

U.S. Official Action dated May 1, 2013 in U.S. Appl. No. 12/907,998.

* cited by examiner

COMMUNICATION AND COORDINATION BETWEEN WEB SERVICES IN A CLOUD-BASED COMPUTING ENVIRONMENT

BACKGROUND

Conventional software applications have generally been installed and executed in a localized computing environment, such as a desktop or enterprise environment. The advancement of increasingly powerful computing devices and expanding data storage capacity in large scale networked data centers has moved consumer and business-oriented applications away from local computing environments to computing environments provided over the Internet or other types of networks, commonly referred to as "cloud-based" computing environments. These applications may be offered as hosted services in the cloud-based computing environment.

As the Internet continues to grow, service providers may continue to offer more diverse hosted services. These hosted services may be offered at various levels, including end user services and various backend services. Combining these hosted services can yield a composite service. It is difficult, however, to integrate multiple levels of hosted services, especially when these hosted services are offered by different service providers. Such integration may rely on effective communication and coordination between the hosted services.

It is with respect to these considerations and others that the disclosure made herein is presented.

SUMMARY

Technologies are described herein for providing communication and coordination between web services in a cloud-based computing environment. A composite service may integrate multiple web services offered by different entities. An example composite service may include a first web service, a second web service, and a third web service. The second web service may consume the first web service because the second web service may utilize results provided by the first web service. Similarly, the first web service may consume the third web service because the first web service may utilize results provided by the third web service.

Through the utilization of the technologies and concepts presented herein, the first web service may be configured with a publish function with which to deliver notifications. The second web service and the third web service may be configured with subscribe functions with which to subscribe to the notifications delivered by the first web service. The first, second, and third web services may each be configured with a publish function, a subscribe function, or a combination thereof. The first web service may utilize the publish function to share a subscription event with the second and third web services. In this way, the second and third web services, which may be affected by the subscription event, can act accordingly.

In an illustrative example, when the first web service wants to go offline for scheduled maintenance, the first web service may publish a notification indicating the first web service's desire to go offline, which is a subscription event. The first web service may also publish additional notifications specifying a duration of the scheduled maintenance, a request to vote whether going offline is acceptable, and/or an instruction for handling existing long-running service calls (e.g., the first web service may have sent a request to the second web service, and the second web service has yet to fulfill the request). Some example instructions may include an instruction discard existing calls and an instruction to complete the call but queue results until the first web service is back online. Upon receiving the notifications, the second and third web services may perform relevant actions in light of the subscription event.

Example technologies may provide communication and coordination between web services in a cloud-based computing environment. The technologies may execute a call to an available events operation in a web service to request subscription event identifiers corresponding to available events at the web service. Upon executing the call to the available events operation, receiving the subscription event identifiers, the technologies may populate a subscribe operation with a relevant subscription event identifier related to a subscribed event from the subscription event identifiers. Upon populating the subscribe operation, the technologies may execute a call to the subscribe operation in the web service to establish a subscription to the web service. Upon executing the call to the subscribe operation, the technologies may receive a subscription identifier corresponding to the subscription. The technologies may receive notifications related to the subscribed event at the web service while the subscription is active.

It should be appreciated that the above-described subject matter may also be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for providing communication and coordination between web services in a cloud-based computing environment. In accordance with some embodiments described herein, each web service in a composite service may be configured with a publish function and/or a subscribe function. A subscribed web service configured with the publish function may deliver notifications related to a subscription event. A subscribing web service configured with the subscribe function may subscribe to the notifications delivered by the subscribed web service. Through the utilization of the publish and subscribe functions, web services can communicate a subscription event and coordinate operations in light of the subscription event.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration, specific embodiments, or examples. Referring now to the drawings, in which like numerals represent like elements through the several figures, a computing system and methodology for providing communication and coordination between web services in a cloud-based computing environment will be described.

Figure 1:
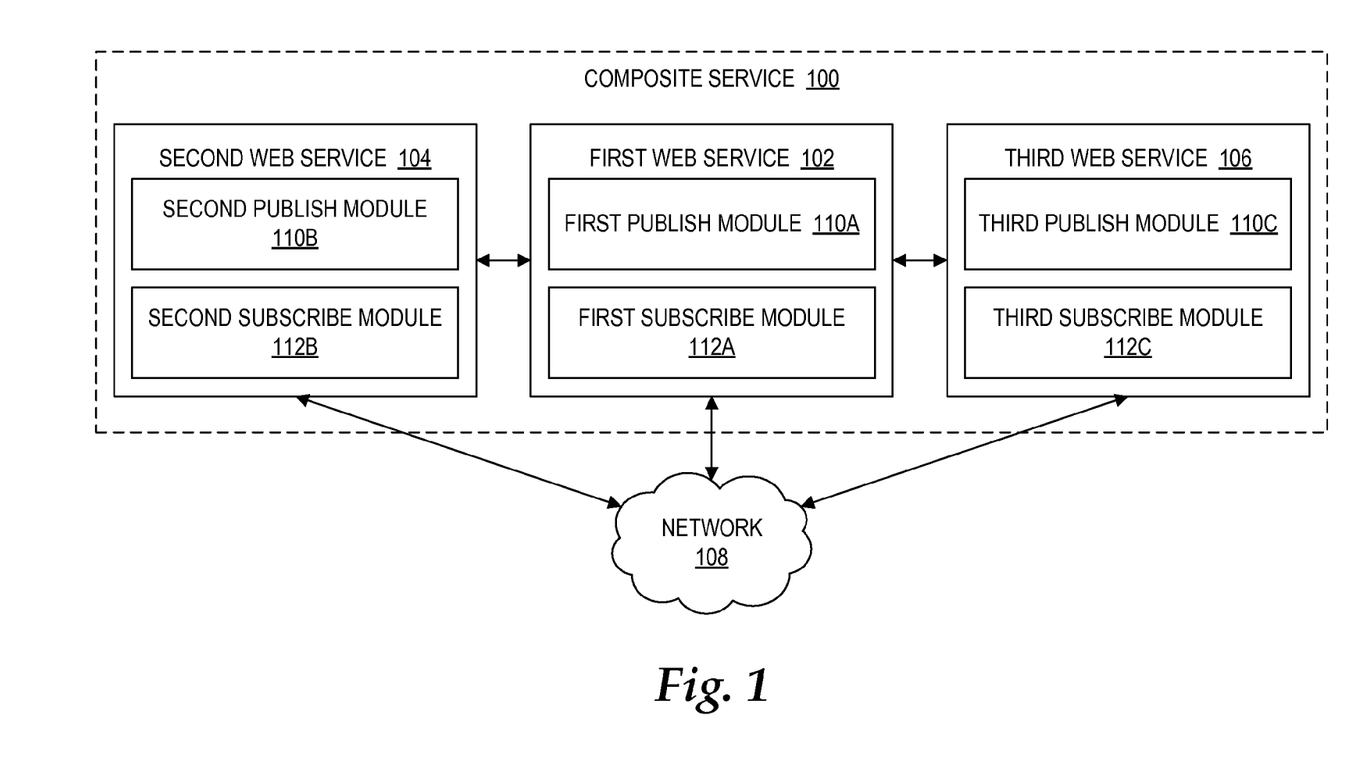
FIG. 1 is a block diagram illustrating a composite service adapted to provide communication and coordination between web services in a cloud-based computing environment, in accordance with some embodiments.

FIG. 1 illustrates a composite service 100 adapted to provide communication and coordination between web services in a cloud-based computing environment, in accordance with some embodiments. The composite service 100 may include a first web service 102, a second web service 104, and a third web service 106. The web services 102-106 may be coupled via a communications network 108. An example of the composite service 100 is the monitoring service described in U.S. patent application Ser. No. 12/900,481, filed Oct. 8, 2010, entitled "Providing a Monitoring Service in a Cloud-Based Computing Environment," which is hereby incorporated by reference in its entirety. Some examples of the web services 102-106 include the various web services (e.g., controller application, monitor application, finder application, analyzer application, notifier application, etc.) also described in the above referenced and incorporated patent application entitled "Providing a Monitoring Service in a Cloud-Based Environment."

The second web service 104 may be configured to consume the first web service 102 because the second web service 104 may utilize results from the first web service 102. In this configuration, the second web service 104 may be referred to as being "downstream" from the first web service 102. The first web service 102 may be configured to consume the third web service 106 because the first web service 102 may utilize results from the third web service 106. In this configuration, the third web service 106 may be referred to as being "upstream" from the first web service 102. Although the composite service 100 illustrated in FIG. 1 includes three web services 102-106, it should be appreciated that other composite services may include any suitable number of web services. Each of these web services may consume one or more other web services at multiple levels.

The first web service 102 may include a first publish module 110A and a first subscribe module 112A. The second web service 104 may include a second publish module 110B and a second subscribe module 112B. The third web service 106 may include a third publish module 110C and a third subscribe module 112C. The publish modules 110A-110C may be collectively referred to as publish modules 110, which are configured to provide a publish function as described below. The subscribe modules 112A-112C may be collectively referred to as subscribe modules 112, which are configured to provide a subscribe function as described below. In other embodiments, some web services may include a publish module or a subscribe module.

The publish modules 110 may provide an interface adapted to receive a call to a subscribe operation (e.g., SubscribeToNotification) for establishing a subscription to a subscription event and an unsubscribe operation (e.g., UnsubscribeToNotification) for terminating the subscription. The subscribe modules 112 may be configured to call the subscribe operation and the unsubscribe operation as necessary. In response to receiving the subscribe operation, the publish modules 110 may be configured to send, to the subscribe modules 112, a subscription identifier corresponding to the subscription. While the subscription is active, the publish modules 110 may deliver notifications to the subscribe modules 112.

For example, the second subscribe module 112B and the third subscribe module 112C may call the subscribe operation in the first publish module 110A in order to establish a subscription to a subscription event with the first web service 102. Upon calling the subscribe operation, the second subscribe module 112B and the third subscribe module 112C may receive a subscription identifier corresponding to the subscription from the first publish module 110A. While the subscription is active, the first publish module 110A may deliver notifications to the second subscribe module 112B and the third subscribe module 112C. At a later time, the second subscribe module 112B and the third subscribe module 112C may call the unsubscribe operation in the first publish module 110A in order to terminate the subscription with the first web service 102. When the subscription has been terminated, the first publish module 110A will no longer deliver notifications to the second subscribe module 112B and/or the third subscribe module 112C. In this example, the first web service 102 may be referred to as a "subscribed web service," and the second and third web services 104, 106 may be referred to as "subscribing web services."

Figure 2:
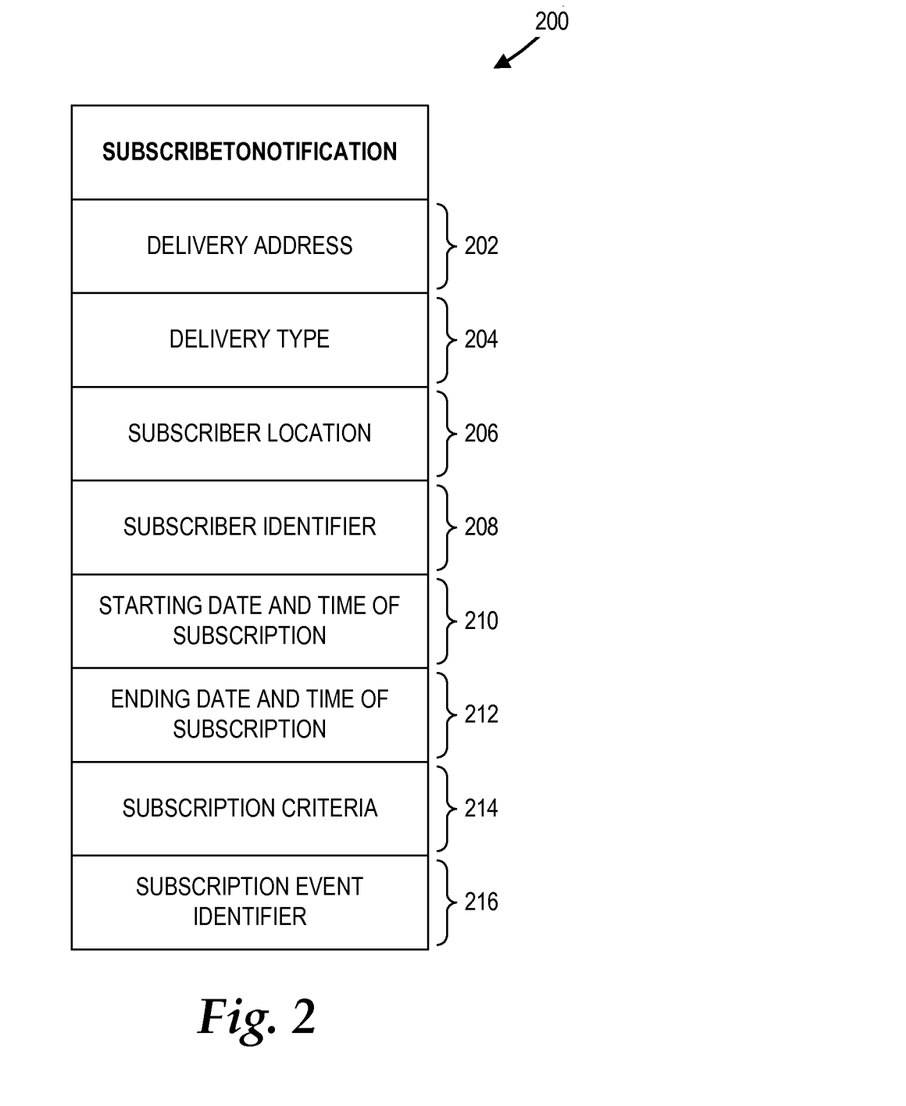
FIG. 2 shows an example structure of a subscribe operation, in accordance with some embodiments.
Figure 3:
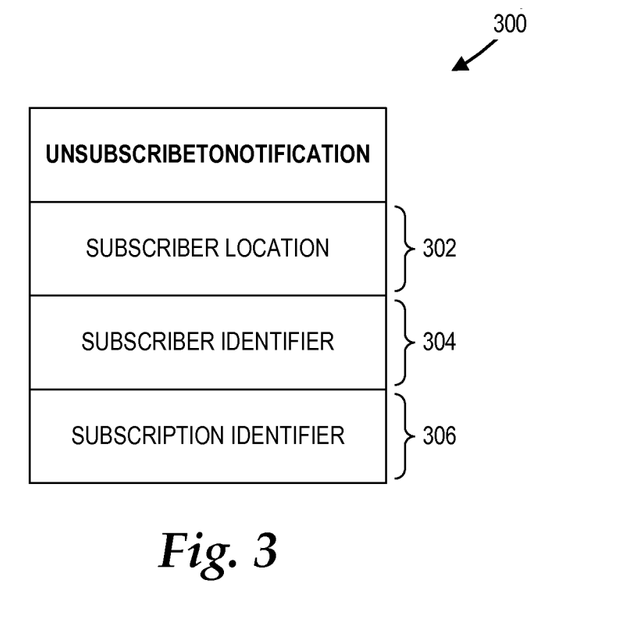
FIG. 3 shows an example structure of an unsubscribe operation, in accordance with some embodiments.

When the subscribe modules 112 call the subscribe operation, the subscribe modules 112 may input one or more subscribe parameters associated with the subscribe operation. An example implementation of the subscribe operation is illustrated in FIG. 2. When the subscribe modules 112 call the unsubscribe operation, the subscribe modules 112 may input one or more unsubscribe parameters associated with the unsubscribe operation. An example implementation of the unsubscribe operation is illustrated in FIG. 3.

Referring now to FIG. 2, an example structure of a subscribe operation 200 is illustrated, in accordance with some embodiments. The subscribe operation 200 may include a first parameter 202, a second parameter 204, a third parameter 206, a fourth parameter 208, a fifth parameter 210, a sixth parameter 212, a seventh parameter 214, and an eighth parameter 216. In an illustrative example, the subscribe operation and the corresponding parameters may be called via the following command: SubscribeToNotification (first parameter, second parameter, third parameter, . . . ). Other implementations of the subscribe operation may include any suitable number of parameters.

The first parameter 202 may specify a delivery address where a notification from the subscribed web service should be delivered. The delivery address may be an IP address or other suitable destination. The second parameter 204 may specify a delivery type of the notification. Some example delivery types may include electronic mail ("email"), voice calls, text messages through Short Message Service ("SMS"), instant messages, and news feeds through Really Simple Syndication ("RSS"). The first parameter 202 may correspond to the second parameter 204. For example, if the second parameter 204 specifies SMS as the delivery type, then the first parameter 202 may specify a phone number as the delivery address.

The third parameter 206 may specify a subscriber location of the subscribing web service. In some embodiments, the subscriber location may refer to a uniform resource locator ("URL") corresponding to the subscribing web service. The fourth parameter 208 may specify a global user identifier ("GUID") or other suitable subscriber identifier of the subscribing web service. For example, each of the web services 102-106 in the composite service 100 may be associated with a separate GUID for identification purposes. The publish modules 110 may deliver notifications via the subscriber location and/or the subscriber identifier. The fifth parameter 210 may specify a date and time when the subscription should begin. The sixth parameter 212 may specify a date and time when the subscription should end.

The seventh parameter 214 may specify subscription criteria of a subscription event related to the subscription. The eighth parameter 216 may specify the subscription event related to the subscription. In some embodiments, each subscription may be associated with a specified subscription event. The subscription event may specify the category of notifications that a subscribing web service is requesting to receive from a subscribed web service. The subscription criteria may further limit the notifications that the subscribing web service is requesting to receive from the subscribed web service An example subscription event may occur when a subscribed web service performs maintenance or updates, thereby causing the subscribed web service to go offline. A subscribing web service may subscribe to notifications from the subscribed web service when it performs maintenance or updates. Some notifications may be one-way notifications, while other notifications may be two-way notifications requesting a response. Some example notifications may include a notification that the subscribed web service requests to go offline to perform the maintenance or updates, a notification of a duration that the subscribed web service will be offline, a notification requesting a vote from the subscribing web services as to whether going offline is acceptable, and a notification of an instruction for handling long-running service calls. In this example, the subscription criteria may indicate that the subscription is limited to notifications where the subscribed web service is requested to be offline beyond a threshold time limit.

A long-running service call may refer to an existing service call from a first web service to a second web service requesting that the second web service perform an operation. Sometimes the operation may take a relatively long time to complete. For example, the operation may be computationally complex or a delayed operation (e.g., an operation sent on January 1 requesting a lowest price for an item on December 1). If results of the service call are completed while the subscribed web service is offline, the subscribing web service, without further instructions, may attempt to send the results to the offline subscribed web service. In this case, the instructions may instruct the subscribing web service to discard the service call or proceed with completing the service call but queue the results until the subscribed web service is back online.

In some embodiments, the interface provided by the publish modules 110 may further be adapted to receive a call to an available events operation (e.g., GetAvailableSubscriptionEvents) for retrieving a list of subscription event identifiers corresponding to available subscription events that can be selected. Each subscription event identifier may be represented by a string, GUID, or other suitable identifier. The subscribe modules 112 may be configured to call the available events operation prior to calling the subscribe operation. For example, the second subscribe module 112B and the third subscribe module 112C may call the available events operation in the first publish module 110A in order to retrieve the available event identifiers corresponding to available events associated with the first web service 102. Upon receiving the subscription event identifiers, the second subscribe module 112B and the third subscribe module 112C can populate the eighth parameter 216 with a relevant subscription event identifier from the retrieved subscription event identifiers.

Referring now to FIG. 3, an example structure of an unsubscribe operation 300 is illustrated, in accordance with some embodiments. The unsubscribe operation 300 may include a first parameter 302, a second parameter 304, and a third parameter 306. In an illustrative example, the unsubscribe operation and the corresponding parameters may be called via the following command: UnSubscribeToNotification (first parameter, second parameter, third parameter). Other implementations of the unsubscribe operation may include any suitable number of parameters.

The first parameter 302 may specify the subscriber location of the subscribing web service. The value of the first parameter 302 may correspond to the value of the third parameter 206 in FIG. 2. The second parameter 304 may specify a subscriber identifier of the subscribing web service. The value of the second parameter 304 may correspond to the value of the fourth parameter 208 in FIG. 2. The third parameter 306 may specify a subscription identifier. As previously described, a subscribed web service may respond with the subscription identifier corresponding to a subscription upon receiving a call to a subscribe operation from a subscribing web service.

Figure 4:
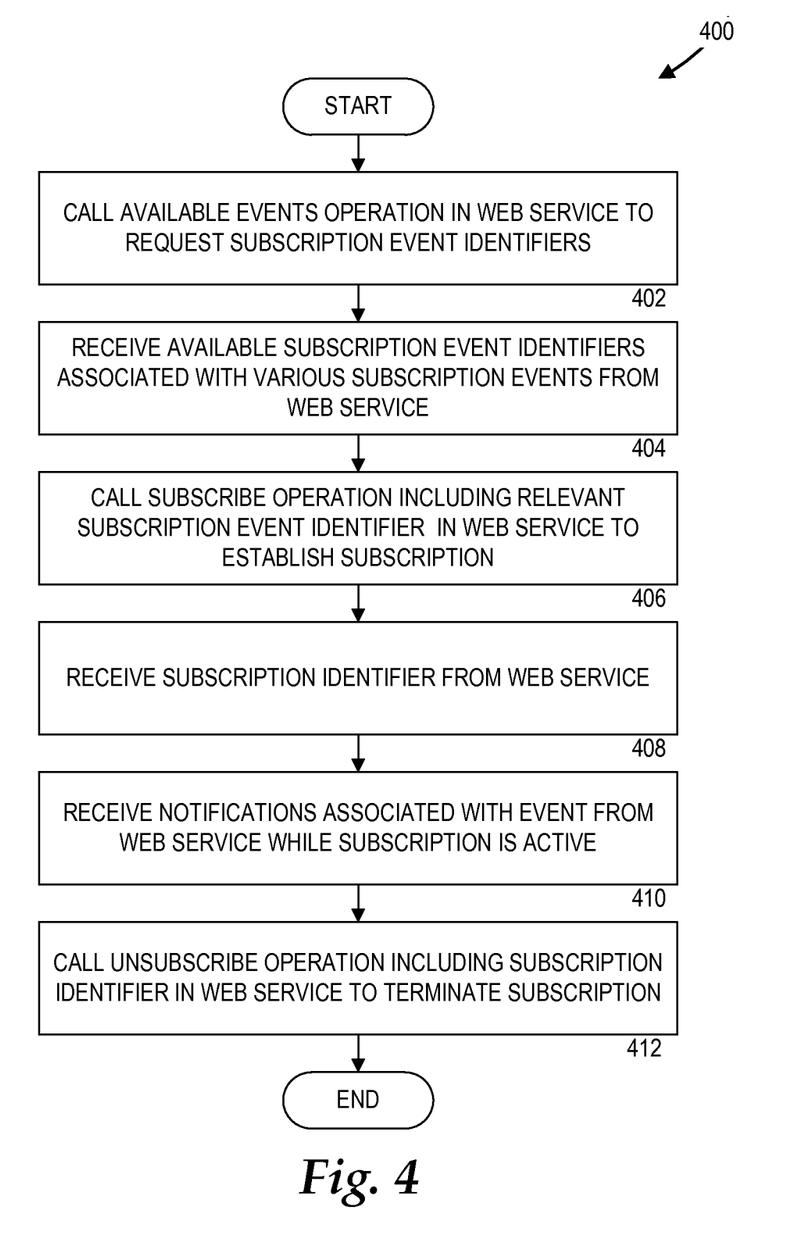
FIG. 4 is a flow diagram illustrating a method for providing communication and coordination between web services in a cloud-based computing environment, in accordance with some embodiments.

Referring now to FIG. 4, additional details regarding the operations of the publish modules 110 and the subscribe modules 112 will be provided. In particular, FIG. 4 is a flow diagram illustrating a method for providing communication and coordination between web services in a cloud-based computing environment, in accordance with some embodiments. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts, and modules may be implemented in software, in firmware, in special purpose digital logic, and any combination thereof. It should be appreciated that more or fewer operations may be performed than shown in the figures and described herein. These operations may also be performed in a different order than those described herein.

In FIG. 4, a routine 400 begins at operation 402, where a subscribe module, such as the subscribe module 112B, calls the available events operation on a web service, such as the first web service 102, to request subscription event identifiers. The routine 400 then proceeds to operation 404, where upon calling the available events operation, the subscribe module 112B may receive multiple subscription event identifiers corresponding to available events on the first web service 102. For example, in response to receiving the call to the available events operation, the first publish module 110A in the first web service 102 may send the subscription event identifiers corresponding to the available events. When the subscribe module 112B receives the subscription event identifiers, the routine 400 proceeds to operation 406.

At operation 406, the subscribe module 112B may call the subscribe operation on the first web service 102 to establish a subscription. When calling the subscribe operation, the subscribe module 112B may populate various parameters, including a relevant subscription event identifier from the retrieved subscription event identifier. The routine 400 may then proceed to operation 408, where upon calling the subscribe operation, the subscribe module 112B may retrieve a subscription identifier corresponding to the subscription. For example, in response to receiving the call to the subscribe operation, the first publish module 110A in the first web service 102 may send the subscription identifier corresponding to the subscription. When the subscribe module 112B receives the subscription identifier, the routine 400 proceeds to operation 410.

At operation 412, the subscribe module 112B may receive one or more notifications associated with the subscribed event from the first web service 102 while the subscription is active. For example, the publish module 110A may delivery notifications associated with the subscribed event to the subscribe module 112B according to the subscription. The routine 400 may then proceed to operation 414, where the subscribe module 112B may call the unsubscribe operation on the first web service 102 to terminate the subscription. When calling the unsubscribe operation, the subscribe module 112B may populate various parameters, including the subscription identifier. For example, upon receiving the call to the unsubscribe operation, the publish module 110A may terminate the subscription. When the subscribe module 112B calls the unsubscribe operation and terminates the subscription, the routine 400 may repeat (e.g., periodically, continuously, or on demand as needed) or terminate.

Figure 5:
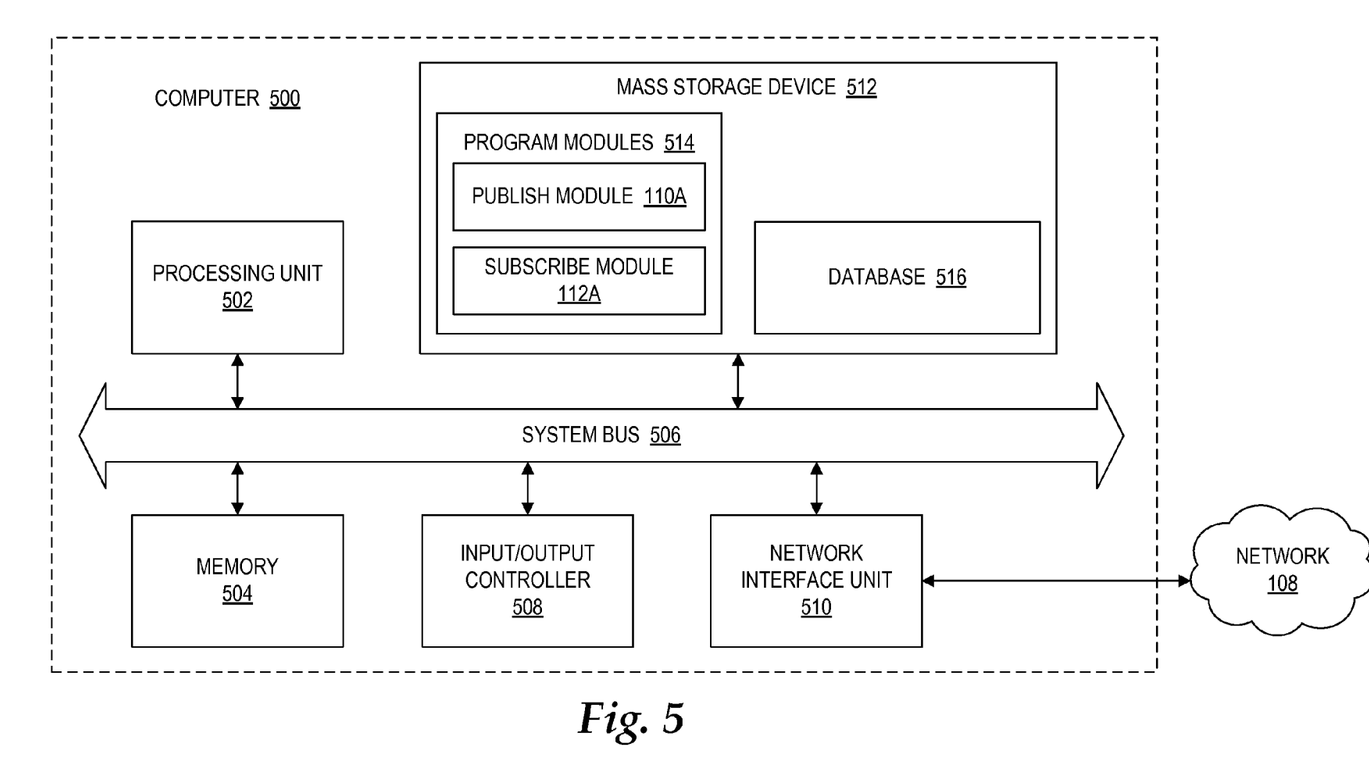
FIG. 5 is a computer architecture diagram showing an illustrative computer hardware architecture for a computing system capable of implementing the embodiments presented herein.

Turning now to FIG. 5, an example computer architecture diagram showing a computer 500 is illustrated. The computer 500 may include a central processing unit 502, a system memory 504, and a system bus 506 that couples the memory 504 to the 502. The computer 500 may further include a mass storage device 512 for storing one or more program modules 514 and the database 516. Examples of the program modules 514 may include the publish module 110A and the subscribe module 112A. The mass storage device 512 may be connected to the processing unit 502 through a mass storage controller (not shown) connected to the bus 506. The mass storage device 512 and its associated computer-storage media may provide non-volatile storage for the computer 500. Although the description of computer-storage media contained herein refers to a mass storage device, such as a hard disk or CD-ROM drive, it should be appreciated by those skilled in the art that computer-storage media can be any available computer storage media that can be accessed by the computer 500.

By way of example, and not limitation, computer-storage media may include volatile and non-volatile, removable and non-removable media implemented in any method or technology for the non-transitory storage of information such as computer-storage instructions, data structures, program modules, or other data. For example, computer-storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 500.

According to various embodiments, the computer 500 may operate in a networked environment using logical connections to remote computers through a network such as the network 108. The computer 500 may connect to the network 108 through a network interface unit 510 connected to the bus 506. It should be appreciated that the network interface unit 510 may also be utilized to connect to other types of networks and remote computer systems. The computer 500 may also include an input/output controller 508 for receiving and processing input from a number of input devices (not shown), including a keyboard, a mouse, a microphone, and a game controller. Similarly, the input/output controller 508 may provide output to a display or other type of output device (not shown).

The bus 506 may enable the processing unit 502 to read code and/or data to/from the mass storage device 512 or other computer-storage media. The computer-storage media may represent apparatus in the form of storage elements that are implemented using any suitable technology, including but not limited to semiconductors, magnetic materials, optics, or the like. The computer-storage media may represent memory components, whether characterized as RAM, ROM, flash, or other types of technology. The computer-storage media may also represent secondary storage, whether implemented as hard drives or otherwise. Hard drive implementations may be characterized as solid state, or may include rotating media storing magnetically-encoded information.

The program modules 514 may include software instructions that, when loaded into the processing unit 502 and executed, cause the computer 500 to provide communication and coordination between web services in a cloud-based computing environment. The program modules 514 may also provide various tools or techniques by which the computer 500 may participate within the overall systems or operating environments using the components, flows, and data structures discussed throughout this description. For example, the program modules 514 may implement interfaces for providing communication and coordination between web services in a cloud-based computing environment.

In general, the program modules 514 may, when loaded into the processing unit 502 and executed, transform the processing unit 502 and the overall computer 500 from a general-purpose computing system into a special-purpose computing system customized to provide communication and coordination between web services in a cloud-based computing environment. The processing unit 502 may be constructed from any number of transistors or other discrete circuit elements, which may individually or collectively assume any number of states. More specifically, the processing unit 502 may operate as a finite-state machine, in response to executable instructions contained within the program modules 514. These computer-executable instructions may transform the processing unit 502 by specifying how the processing unit 502 transitions between states, thereby transforming the transistors or other discrete hardware elements constituting the processing unit 502.

Encoding the program modules 514 may also transform the physical structure of the computer-storage media. The specific transformation of physical structure may depend on various factors, in different implementations of this description. Examples of such factors may include, but are not limited to: the technology used to implement the computer-storage media, whether the computer-storage media are characterized as primary or secondary storage, and the like. For example, if the computer-storage media are implemented as semiconductor-based memory, the program modules 514 may transform the physical state of the semiconductor memory, when the software is encoded therein. For example, the program modules 514 may transform the state of transistors, capacitors, or other discrete circuit elements constituting the semiconductor memory.

As another example, the computer-storage media may be implemented using magnetic or optical technology. In such implementations, the program modules 514 may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope of the present description, with the foregoing examples provided only to facilitate this discussion.

Based on the foregoing, it should be appreciated that technologies for providing communication and coordination between web services in a cloud-based computing environment are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for providing communication and coordination between web services in a cloud-based computing environment, the method comprising computer-implemented operations for:
    executing a call to an available events operation in a web service to request subscription event identifiers corresponding to available events at the web service;
    upon executing the call to the available events operation, receiving the subscription event identifiers;
    upon receiving the subscription event identifiers, populating a subscribe operation with a relevant subscription event identifier related to a subscribed event from the subscription event identifiers, wherein the subscribed event comprises maintenance of the web service causing the web service to be offline;
    upon populating the subscribe operation, executing a call to the subscribe operation in the web service to establish a subscription to the web service;
    upon executing the call to the subscribe operation, receiving a subscription identifier corresponding to the subscription;
    receiving notifications related to the subscribed event at the web service while the subscription is active by receiving a notification to discard existing long-running service calls; and
    upon receiving the notification to discard existing long-running service calls; discarding existing long-running service calls.

2. The computer-implemented method of claim 1, the method further comprising computer-implemented operations for:
    populating an unsubscribe operation with the subscription identifier; and
    upon populating the unsubscribe operation, executing a call to the unsubscribe operation in the web service to terminate the subscription to the web service.

3. The computer-implemented method of claim 1, wherein receiving notifications related to the subscribed event at the web service while the subscription is active comprises receiving a notification to proceed with existing long-running service calls and to queue any results of the existing long-running service calls until the web service is back online; and
    upon receiving the notification to proceed with existing long-running service calls, queuing the results of the existing long-running service calls until the web service is back online.

4. The computer-implemented method of claim 1, wherein receiving notifications related to the subscribed event at the web service while the subscription is active comprises receiving a request from the web service to go offline for maintenance.

5. The computer-implemented method of claim 4, wherein receiving notifications related to the subscribed event at the web service while the subscription is active comprises receiving a notification to vote whether the web service should go offline; and
    upon receiving the notification to vote whether the web service should go offline, sending the vote as to whether the web service should go offline to the web service.

6. The computer-implemented method of claim 1, the method further comprising computer-implemented operations for:
    populating the subscribe operation with a delivery address specifying a destination where the notifications should be delivered; and
    populating the subscribe operation with a delivery type specifying a delivery method for delivering the notifications.

7. The computer-implemented method of claim 6, the method further comprising computer-implemented operations for:
    populating the subscribe operation with a subscriber location; and
    populating the subscribe operation with a subscriber identifier.

8. The computer-implemented method of claim 6, the method further comprising computer-implemented operations for:
    populating the subscribe operation with a starting time and date for the subscription; and
    populating the subscribe operation with an ending time and date for the subscription.

9. A computer system, comprising:
a processor;
a memory communicatively coupled to the processor; and
a program module which executes in the processor from the memory and which, when executed by the processor, causes the computer system to provide communication and coordination between web services in a cloud-based computing environment by
executing, from a first web service, a call to an available events operation in a second web service to request subscription event identifiers corresponding to available events at the second web service,
upon executing the call to the available events operation, receiving, at the first web service, the subscription event identifiers,
upon receiving the subscription event identifiers, populating, at the first web service, a subscribe operation with a relevant subscription event identifier related to a subscribed event from the subscription event identifiers, wherein the subscribed event comprises updating of the second web service causing the second web service to be offline,
upon populating the subscribe operation, executing, from the first web service, a call to the subscribe operation in the second web service to establish a subscription to the second web service,
upon executing the call to the subscribe operation, receiving, at the first web service, a subscription identifier corresponding to the subscription,
receiving, at the first web service, notifications related to the subscribed event at the second web service while the subscription is active by receiving, at the first web service, a notification to discard existing long-running service calls; and
upon receiving the notification to discard existing long-running service calls, discarding, at the first web service, the existing long-running service calls.

10. The computer system of claim 9, wherein the program module further causes the computer system to provide communication and coordination between web services in a cloud-based computing environment by
populating, at the first web service, an unsubscribe operation with the subscription identifier; and
upon populating the unsubscribe operation, executing, from the first web service, a call to the unsubscribe operation in the second web service to terminate the subscription to the second web service.

11. The computer system of claim 9, wherein the first web service and the second web service are parts of a composite service.

12. The computer system of claim 11, wherein the first web service consumes the second web service.

13. The computer system of claim 11, wherein the second web service consumes the first web service.

14. The computer system of claim 9, wherein receiving notifications related to the subscribed event at the second web service while the subscription is active comprises receiving, at the first web service, a notification to proceed with existing long-running service calls and to queue any results of the existing long-running service calls until the second web service is back online; and
upon receiving the notification to proceed with existing long-running service calls, queuing, at the first web service, the results of the existing long-running service calls until the second web service is back online.

15. The computer system of claim 9, wherein receiving notifications related to the subscribed event at the second web service while the subscription is active comprises receiving, at the first web service, a request from the second web service to go offline for updates;
wherein receiving notifications related to the subscribed event at the second web service while the subscription is active comprises receiving, at the first web service, a notification to vote whether the second web service should go offline; and
upon receiving the notification to vote whether the second web service should go offline, sending, at the first web service, the vote as to whether the second web service should go offline to the second web service.

16. A non-transitory computer-readable storage medium having computer-executable instructions stored thereon which, when executed by a computer, cause the computer to:
execute, from a first web service, a call to an available events operation in a second web service to request subscription event identifiers corresponding to available events at the second web service; upon executing the call to the available events operation, receive, at the first web service, the subscription event identifiers;
upon receiving the subscription event identifiers, populate, at the first web service, a subscribe operation with a relevant subscription event identifier related to a subscribed event from the subscription event identifiers, wherein the subscribed event comprises updating of the second web service causing the second web service to be offline;
upon populating the subscribe operation, execute, from the first web service, a call to the subscribe operation in the second web service to establish a subscription to the second web service;
upon executing the call to the subscribe operation, receive, at the first web service, a subscription identifier corresponding to the subscription;
receive, at the first web service, notifications related to the subscribed event at the second web service while the subscription is active by receiving, at the first web service, a notification to discard existing long-running service calls; and
upon receiving the notification to discard existing long-running service calls, discarding, at the first web service, the existing long-running service calls;
upon receiving the notifications related to the subscribed event, populate, at the first web service, an unsubscribe operation with the subscription identifier; and
upon populating the unsubscribe operation, execute, from the first web service, a call to the unsubscribe operation in the second web service to terminate the subscription to the second web service.

* * * * *